(12) United States Patent
Lee et al.

(10) Patent No.: US 9,401,592 B2
(45) Date of Patent: Jul. 26, 2016

(54) DISCHARGE CIRCUITS OF DISCHARGE PATHS FOR ELECTROMAGNETIC INTERFERENCE FILTERS

(71) Applicant: Fairchild (Taiwan) Corporation, Taipei (TW)

(72) Inventors: Yuan-Pu Lee, Hsinchu (TW); Chi-Chen Chung, Jhubei (TW); Chen-Hua Chiu, New Taipei (TW); Wei-Hsuan Huang, Taoyuan (TW)

(73) Assignee: FAIRCHILD (TAIWAN) CORPORATION, Taipei (TW)

( * ) Notice: Subject to any disclaimer, the term of this patent is extended or adjusted under 35 U.S.C. 154(b) by 134 days.

(21) Appl. No.: 14/554,174

(22) Filed: Nov. 26, 2014

(65) Prior Publication Data

US 2015/0146331 A1 May 28, 2015

Related U.S. Application Data

(60) Provisional application No. 61/909,408, filed on Nov. 27, 2013.

(51) Int. Cl.
*H02H 9/04* (2006.01)
*H02H 1/00* (2006.01)
*H02H 9/00* (2006.01)

(52) U.S. Cl.
CPC ............. *H02H 1/0007* (2013.01); *H02H 9/005* (2013.01)

(58) Field of Classification Search
CPC .............................. H02H 1/0007; H02H 9/041
USPC .......................................................... 361/56
See application file for complete search history.

(56) References Cited

U.S. PATENT DOCUMENTS

| 8,625,251 | B2* | 1/2014 | Urienza | H02M 1/44 361/220 |
| 8,710,804 | B2* | 4/2014 | Ptacek | H02M 1/126 307/109 |
| 2011/0122668 | A1* | 5/2011 | Lo | H02J 9/061 363/126 |
| 2012/0008354 | A1* | 1/2012 | Tang | H02M 1/32 363/126 |
| 2012/0207505 | A1* | 8/2012 | Kobayashi | H02M 1/32 399/88 |
| 2013/0147440 | A1* | 6/2013 | Shiroyama | G01R 31/40 320/166 |
| 2013/0235627 | A1* | 9/2013 | Huang | H02M 1/126 363/44 |
| 2013/0278159 | A1* | 10/2013 | Del Carmen, Jr. | H05B 33/0809 315/200 R |
| 2013/0335038 | A1* | 12/2013 | Lee | H02M 1/126 320/166 |

\* cited by examiner

*Primary Examiner* — Scott Bauer
(74) *Attorney, Agent, or Firm* — McClure, Qualey & Rodack, LLP

(57) ABSTRACT

A discharge circuit for an electromagnetic interference (EMI) filter is provided. The discharge circuit includes a switch circuit, a control circuit, and a detection circuit. The switch circuit is coupled to an X-capacitor of the EMI filter. The control circuit is coupled to the switch circuit and configured to turn on the switch circuit in a predetermined period to provide a discharge path. The detection circuit is coupled to the discharge path. In the predetermined period, the detection circuit detects whether a cross point occurs between a discharge voltage signal on the discharge path and a reference voltage signal to generate a detection signal which is provided to the control circuit. When the detection circuit detects that the cross point does not occur, the control circuit continuously turns on the switch circuit according to the detection signal after the predetermined period has elapsed.

11 Claims, 8 Drawing Sheets

DISCHARGE CIRCUITS OF DISCHARGE PATHS FOR ELECTROMAGNETIC INTERFERENCE FILTERS

CROSS REFERENCE TO RELATED APPLICATIONS

This application claims the benefit of U.S. Provisional Application No. 61/909,408, filed on Nov. 27, 2013, the contents of which are incorporated herein by reference.

BACKGROUND OF THE INVENTION

1. Field of the Invention

The present invention relates to a discharge circuit for an electromagnetic interference (EMI) filter, and, more specifically, a discharge circuit for providing a discharge path for an X-capacitor of an EMI filter.

2. Description of the Related Art

Switching mode power supplies have been widely used to provide regulated power for computers, home appliances, communication equipments, etc. In recent years, the problem of power saving in switching mode power supplies has drawn much attention. Based on the restriction of environmental pollution, the computer and other equipment manufactures have been striving to meet the power management and energy conservation requirements.

FIG. 1 shows a traditional approach for filtering electromagnetic interference (EMI) and providing a DC voltage. An EMI filter located between a power source $V_{AC}$ and a bridge rectifier 10 includes a choke $L_1$, X-capacitors $C_1$ and $C_2$. The X-capacitor $C_1$ is placed across the power source $V_{AC}$. The choke $L_1$ is coupled between the power source $V_{AC}$ and the bridge rectifier 10. The X-capacitor $C_2$ is coupled between the choke $L_1$ and an input of the bridge rectifier 10. A bulk capacitor $C_{IN}$ connected from an output of the bridge rectifier 10 to a ground is for stabilizing the DC voltage $V_{BUS}$ at the output of the bridge rectifier 10. For satisfying regulations in US and European, a bleeding resistor $R_D$ is generally placed across the X-capacitors $C_1$ or $C_2$ of the EMI filter. The bleeding resistor $R_D$ will discharge the stored energy at the X-capacitors $C_1$ and $C_2$ to prevent an electric shock when end-user cut off the power source $V_{AC}$. In fact, the bleeding resistor $R_D$ always has a fixed power-loss as long as the X-capacitors $C_1$ and $C_2$ have the stored voltage. Besides, for higher power source, the bleeding resistor $R_D$ consumes much standby-power when the power supply is operated at no-load. Therefore, the disadvantage of the traditional approach causes a poor power saving at light-load and no-load. Because of the existence of the X-capacitors, it has become a major concern to reduce the standby-power.

BRIEF SUMMARY OF THE INVENTION

Thus, it is desirable to provide a discharge circuit for an electromagnetic interference (EMI) filter without a bleeding resistor, such that the power consumption can be saved, and the power management and energy conservation requirements can be met.

An embodiment of a discharge circuit for an electromagnetic interference (EMI) filter is provided. The discharge circuit comprises a switch circuit, a control circuit, and a detection circuit. The switch circuit is coupled to an X-capacitor of the EMI filter. The control circuit is coupled to the switch circuit and configured to turn on the switch circuit in a predetermined period to provide a discharge path. The detection circuit is coupled to the discharge path. In the predetermined period, the detection circuit detects whether a cross point occurs between a discharge voltage signal on the discharge path and a reference voltage signal to generate a detection signal which is provided to the control circuit. When the detection circuit detects that the cross point does not occur between the discharge voltage signal and the reference voltage signal, the control circuit continuously turns on the switch circuit according to the detection signal after the predetermined period has elapsed.

In an embodiment, the discharge circuit further comprises a first resistor and a second resistor. The first resistor is coupled between the X-capacitor and the switch circuit at a first node. The second resistor is coupled between the switch circuit and a reference ground at a second node. The discharge voltage signal is generated at the first node, and the detection circuit is coupled to the second node.

In another embodiment, the control circuit comprises a first D flip-flop, a second D flip-flop, and an OR gate. The first D flip-flop has an input terminal receiving a supply voltage, a clock terminal receiving the detection signal, a reset terminal receiving a switch signal, and an output terminal, and an inverted output terminal generates a clean signal. The second D flip-flop has an input terminal receiving the supply voltage, a clock terminal receiving a clock signal, a reset terminal receiving the clean signal, an output terminal generating a lock signal, and an inverted output terminal. The OR gate receives the clock signal and the lock signal and generates the switch signal according to the clock signal and the lock signal for turning on or off the switch circuit.

In an embodiment, the detection circuit comprises a comparator. The comparator compares the discharge voltage signal with the reference voltage signal to generate the detection signal. In another embodiment, the reference voltage signal varies with the discharge voltage signal before the predetermined period.

In further another embodiment, when the detection circuit detects that the cross point occurs between the discharge voltage signal on the discharge path and the reference voltage signal, the control circuit turns off the switch circuit according to the detection signal after the predetermined period.

Another exemplary embodiment of a discharge circuit for an electromagnetic interference (EMI) filter is provided. The discharge circuit comprises a control circuit and a detection circuit. The control circuit controls a discharge path to be formed from an X-capacitor of the EMI filter to a reference ground in a predetermined period. The detection circuit detects whether a cross point occurs between a discharge voltage signal on the discharge path and a reference voltage signal to generate a detection signal which is provided to the control circuit. When the detection circuit detects that the cross point occurs between the discharge voltage signal and the reference voltage signal, the control circuit cuts off the discharge path according to the detection signal after the predetermined period has elapsed. When the detection circuit detects that the cross point does not occur between the discharge voltage signal and the reference voltage signal, the control circuit conducts the discharge path according to the detection signal after the predetermined period.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
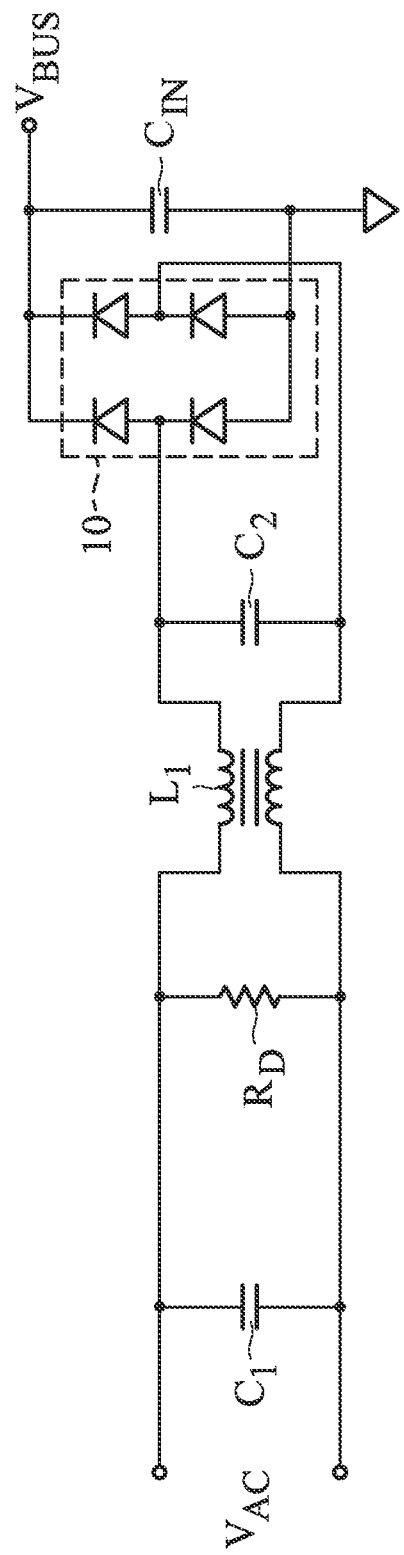
FIG. 1 shows a traditional approach for filtering electromagnetic interference (EMI) and providing a DC voltage.
Figure 2:
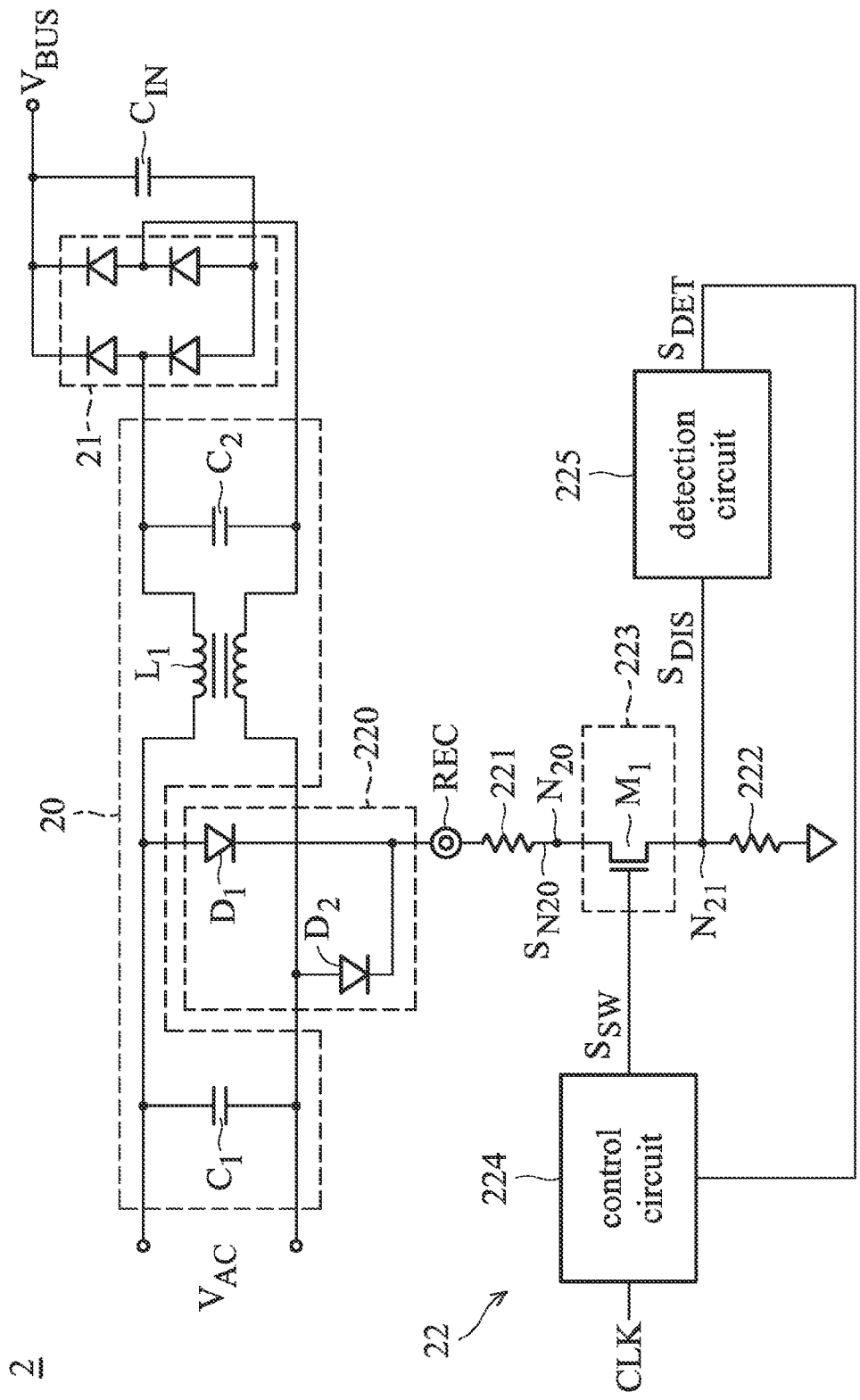
FIG. 2 shows an exemplary embodiment of a power supply circuit according to the present invention.

FIG. 2 shows an exemplary embodiment of a power supply circuit according to the present invention. As shown in FIG. 2, a power supply circuit 2 comprises an electromagnetic interference (EMI) filter 20, a bridge rectifier 21, a bulk capacitor $C_{IN}$, and a discharge circuit 22. The EMI filter 20 is coupled between a power source $V_{AC}$ and a bridge rectifier 21. The EMI filter 20 comprises a choke $L_1$, X-capacitors $C_1$ and $C_2$. The X-capacitor $C_1$ is coupled across the power source $V_{AC}$. The choke $L_1$ is coupled between the power source $V_{AC}$ and the bridge rectifier 21. The X-capacitor $C_2$ is coupled between the choke $L_1$ and an input of the bridge rectifier 21. A bulk capacitor $C_{IN}$ is coupled from an output of the bridge rectifier 21 to a reference ground is for stabilizing a DC voltage $V_{BUS}$ at the output of the bridge rectifier 21, which serves as an output voltage of the power supply circuit 2. In the embodiment, there is no bleeding resistor coupled across the X-capacitors $C_1$ or $C_2$ of the EMI filter 20.

Referring to FIG. 2, the discharge circuit 22 is couple to the X-capacitor $C_1$ of the EMI filter 20. The discharge circuit 22 comprises a rectifier 220, resistors 221 and 222, a switch circuit 223, a control circuit 224, and a detection circuit 225. In the embodiment, the switch circuit 223 is implemented by an N-type metal oxide semiconductor (NMOS) transistor M1 which has a gate, a drain, and a source. The rectifier 220 is implemented by a full-wave rectifier to rectify the power source $V_{AC}$. The rectifier 220 comprises diodes $D_1$ and $D_2$. Anodes of the diodes $D_1$ and $D_2$ are coupled to the power source $V_{AC}$. Cathodes of the diodes $D_1$ and $D_2$ are coupled to one terminal of the resistor 221 at a node REC. The other terminal of the resistor 221 is coupled to the drain of the NMOS transistor $M_1$ at a node $N_{20}$ (the node $N_{20}$ severing as one node of the resistor 21). The source of the NMOS transistor $M_1$ is coupled to one terminal of the resistor 222 at a node $N_{21}$ (the node $N_{21}$ severing as the other node of the resistor 21). The other terminal of the resistor 222 is coupled to the reference ground. The gate of the NMOS transistor $M_1$ receives a switch signal $S_{SW}$ generated by the control circuit 224. The detection circuit 225 is coupled the node $N_{21}$ where a discharge voltage signal $S_{DIS}$ is generated to generates a detection signal $S_{DET}$. The control circuit 224 receives the detection signal $S_{DET}$ and a clock signal CLK for generating the switch signal $S_{SW}$.

Figure 3:
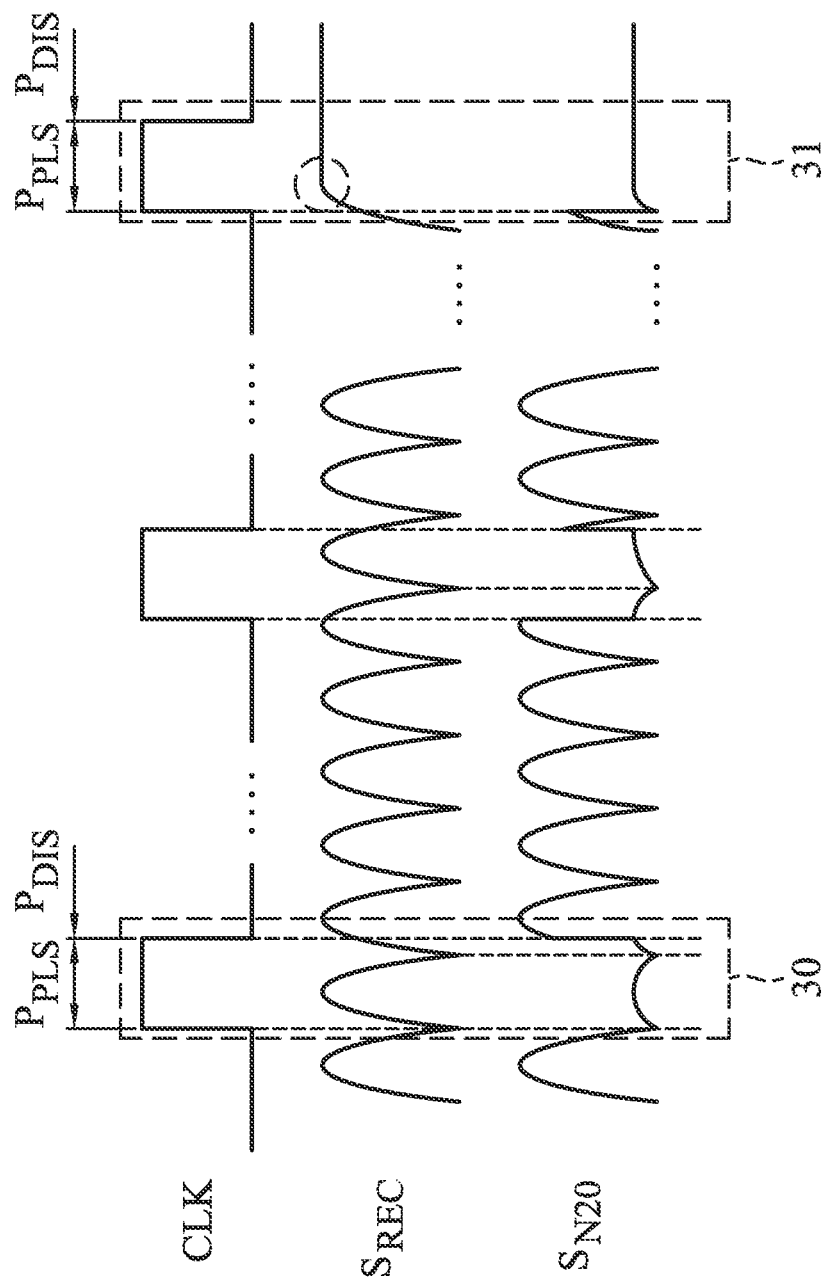
FIG. 3 shows an exemplary embodiment of key signals of the power supply circuit in FIG. 2.

FIG. 3 shows an exemplary embodiment of key signals of the power supply circuit 2. The clock signal CLK is a periodical signal, and a period $P_{PLS}$ when the pulse width of the clock signal CLK remains is defined as a predetermined period. $S_{REC}$ represents a voltage signal which is generated by rectifying the power source $V_{AC}$ through the rectifier 220. $S_{N20}$ represents a voltage signal which is generated the node $N_{20}$ between the resistor 221 and the NMOS transistor M1. In the embodiment, the predetermined period $P_{PLS}$ is longer than the period of a half of the waveform of the voltage signal $S_{REC}$, in other words, the predetermined period $P_{PLS}$ is longer than the period of a half of the cycle of the power source $V_{AC}$. When the power source $V_{AC}$ is being provided, in each predetermined period $P_{PLS}$, the control circuit 224 generates the switch signal $S_{SW}$ according to the detection signal $S_{DET}$ and the clock signal CLK to turn on the NMOS transistor $M_1$. At this time, a discharge path from the X-capacitor $C_1$ to the reference ground through the resistor 221, the turned-on NMOS transistor $M_1$, and the resistor 222 is provided. In the case where the power source $V_{AC}$ is being provided, once the discharge path is provided due to the turned-on NMOS transistor $M_1$ (that in the predetermined period $P_{PLS}$), the magnitude of the voltage signal $S_{N20}$ is reduced in response to the resistance of the resistor 222, and, however, the voltage signal $S_{N20}$ varies with the waveform of the voltage signal $S_{REC}$. Moreover, since the NMOS transistor $M_1$ is turned on in the predetermined period $P_{PLS}$, the voltage signal $S_{N20}$ is transmitted to the node $N_{21}$ to serve as the discharge voltage signal $S_{DIS}$ on the discharge path. In the predetermined period $P_{PLS}$, the detection circuit 225 detects whether a cross point occurs between the discharge voltage signal $S_{DIS}$ and a reference voltage signal $S_{REF1}$ to generate the detection signal $S_{DET}$. When the power source $V_{AC}$ is being provided, the detection circuit 225 detects that across point occurs between the discharge voltage signal $S_{DIS}$ and the reference voltage signal $S_{REF1}$, and the control circuit 224 generates the switch signal $S_{SW}$ according to the detection signal $S_{DET}$ to turn off the NMOS transistor $M_1$ after the predetermined period $P_{PLS}$; that is, in the period $P_{DIS}$ following the predetermined period $P_{PLS}$, the control circuit 224 cuts off the discharge path according to the detection signal $S_{DET}$. When the power source $V_{AC}$ stops being provided (such as when the plug of the power supply circuit 2 is out from the socket), the detection circuit 225 detects that no cross point occurs between the discharge voltage signal $S_{DIS}$ and the reference voltage signal $S_{REF1}$ in the predetermined period $P_{PLS}$, and the control circuit 224 generates the switch signal $S_{SW}$ according to the detection signal $S_{DET}$ to continuously turn on the NMOS transistor $M_1$ after the predetermined period $P_{PLS}$ has elapsed; that is, in the period $P_{DIS}$ following the predetermined period $P_{PLS}$, the control circuit 224 conducts the discharge path according to the detection signal $S_{DET}$.

Figure 4:
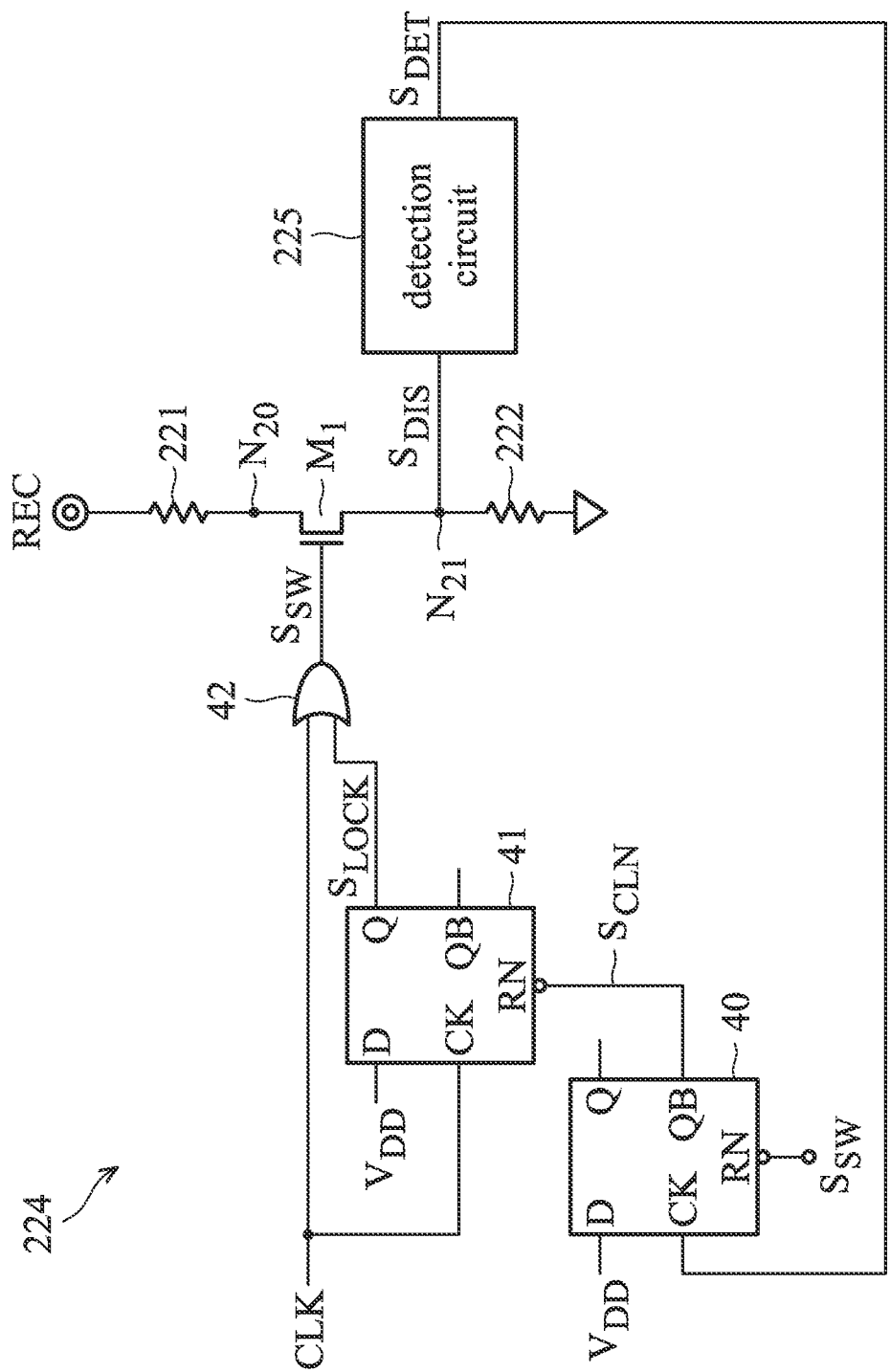
FIG. 4 shows an exemplary embodiment of a control circuit of the power supply circuit in FIG. 2.

FIG. 4 shows an exemplary embodiment of the control circuit 224. As shown in FIG. 4, the control circuit 224 comprises D flip-flops 40 and 41 and an OR gate 42. The D-flipflop 40 has an input terminal D receiving a supply voltage $V_{DD}$, a clock terminal CK receiving the detection signal $S_{DET}$ from the detection circuit 225, a reset terminal RN receiving the switch signal $S_{SW}$, an output terminal Q, and an inverted output terminal QB generating a clean signal $S_{CLN}$, wherein the clean signal $S_{CLN}$ is inverse to a signal generated at the output terminal Q. The D flip-flop 41 has an input terminal D receiving the supply voltage $V_{DD}$, a clock terminal CK receiving the clock signal CLK, a reset terminal RN receiving the clean signal $S_{CLN}$, an output terminal Q generating a lock signal $S_{LOCK}$, and an inverted output terminal QB. The OR gate 42 receives the clock signal CLK and the lock signal $S_{LOCK}$ and generates the switch signal $S_{SW}$ according to the clock signal CLK and the lock signal $S_{LOCK}$. The switch signal $S_{SW}$ is applied to turn on or off the NMOS transistor $M_1$. In the embodiment, the D flip-flops 40 and 41 are triggered by rising edges of the signals at the respective clock terminals CK and reset by the signals with low levels at the respective reset terminals RN.

Figure 5:
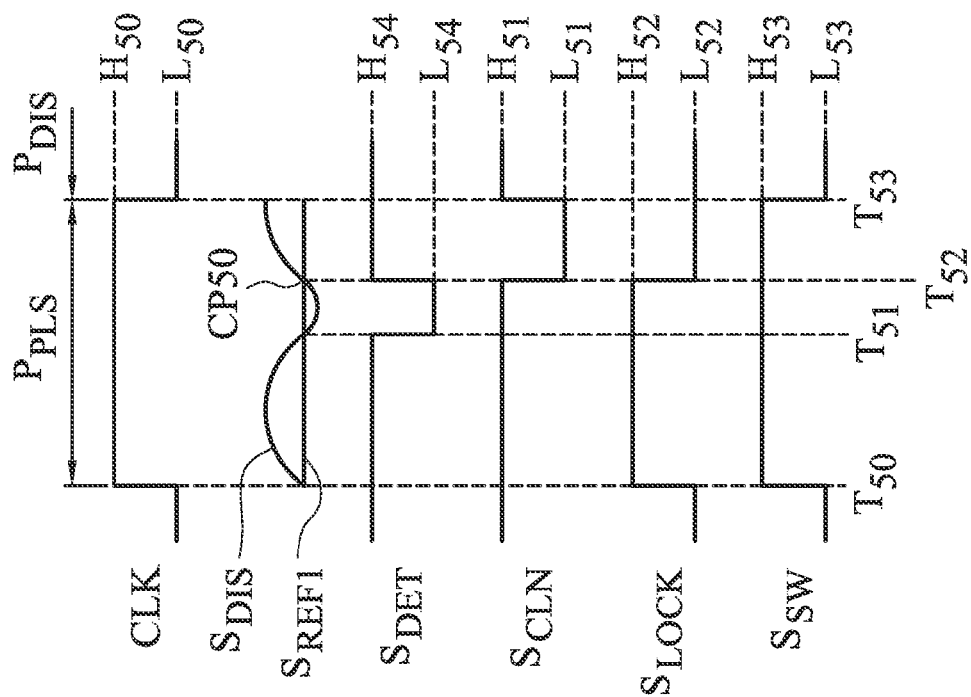
FIG. 5 shows an exemplary embodiment of waveforms of key signals in the case where a discharge path is provided in a predetermined period and then cut off after the predetermined period has elapsed.

In FIG. 3, a dotted-line block 30 is taken an example for illustrating the case where the discharge path is provided in the predetermined period $P_{PLS}$ and then cut off after the predetermined period $P_{PLS}$. The detailed waveforms of the key signals in the case of dotted-line block 30 are shown in FIG. 5. Before the time point T50, the detection signal $S_{DET}$ is initially at a high level H54, the clean signal $S_{CLN}$ is initially at a high level H51, and the lock signal $S_{LOCK}$ is initially at a low level L52. At the time point T50 (the beginning of the predetermined period $P_{PLS}$), the clock signal CLK switches to a high level H50 from a low level L50. The switch signal $S_{SW}$ switches to a high level H53 from a low level L53 in response to the switching of the clock signal CLK through the OR gate 42. In the period from the time point T50 to a time point T51, the discharge voltage signal $S_{DIS}$ is larger than the reference voltage signal $S_{REF1}$, and the detection circuit 225 still generates the detection signal $S_{DET}$ with the high level H54. Since the D flop-flop 40 is not triggered, the clean signal $S_{CLN}$ remains at the high level H51. Moreover, at the time point T50, the lock signal $S_{LOCK}$ switches to a high level H52 from the low level L52 in response to the rising edge of the clock signal CLK. Thus, the switch signal $S_{SW}$ remains at the high level H53 according to the OR logic between the clock signal CLK with the high level H50 and the lock signal $S_{LOCK}$ with the high level H52 in the period from the time point T50 to the time point T51.

Then, in the period from the time point T51 to a time point T52, the discharge voltage signal $S_{DIS}$ is less than the reference voltage signal $S_{REF1}$, and the detection circuit 225 generates the detection signal $S_{DET}$ with a low level L54. The D flop-flop 40 is still not triggered, and the clean signal $S_{CLN}$ remains at the high level H51 until the time point T52. Moreover, the D flop-flop 41 is also not triggered, and the lock signal $S_{LOCK}$ remains at the high level H51 until the time point T52. Thus, the switch signal $S_{SW}$ still remains at the high level H53 according to the OR logic between the clock signal CLK with the high level H50 and the lock signal $S_{LOCK}$ with the high level H52 in the period from the time point T51 to the time point T52.

In the period from the time point T52 to a time point T53, the discharge voltage signal $S_{DIS}$ is larger than the reference voltage signal $S_{REF1}$ again, and the detection circuit 225 generates the detection signal $S_{DET}$ with the high level H54. Thus, a cross point CP50 occurs between the discharge voltage signal $S_{DIS}$ and the reference voltage signal $S_{REF1}$ in a rising direction, and, thus, the detection signal $S_{DET}$ has a rising edge at the time point T52. The rising edge of the detection signal $S_{DET}$ triggers the D flop-flop 40 to generate the clean signal $S_{CLN}$ with a low level L51 at the time point T52, and the clean signal $S_{CLN}$ remains at the low level L51 until the time point T53. The D flip-flop 41 is then reset by the clean signal $S_{CLN}$ with the low level L51 to generate the lock signal $S_{LOCK}$ with the low level L52. Thus, the switch signal $S_{SW}$ still remains at the high level H53 according to the OR logic between the clock signal CLK with the high level H50 and the lock signal $S_{LOCK}$ with the low level L52 in the period from the time point T52 to the time point T53.

At the time point T53, the clock signal CLK switches to the low level L50 from the high level H50. Thus, the lock signal $S_{LOCK}$ still remains at the low level L52. The switch signal $S_{SW}$ switches to the low level L53 from the high level H53 according to the OR logic between the clock signal CLK with the low level L50 and the lock signal $S_{LOCK}$ with the low level L52. The D flip-flop 40 is reset by the switch signal $S_{SW}$ with the low level L53 to generate the clean signal $S_{CLN}$ with the high level H51.

According to the above operation timing, in the predetermined period $P_{PLS}$, the switch signal $S_{SW}$ with the high level H53 turns on the NMOS transistor $M_1$, and the discharge path is provided for the X-capacitor $C_1$. When the power source $V_{AC}$ is being provided continuously which is realized by detecting that the cross point CP50 occurs in the predetermined period $P_{PLS}$, after the predetermined period $P_{PLS}$ has elapsed (that is after the time point T53), the switch signal $S_{SW}$ turns off the NMOS transistor $M_1$, and the discharge path is cut off.

Figure 6:
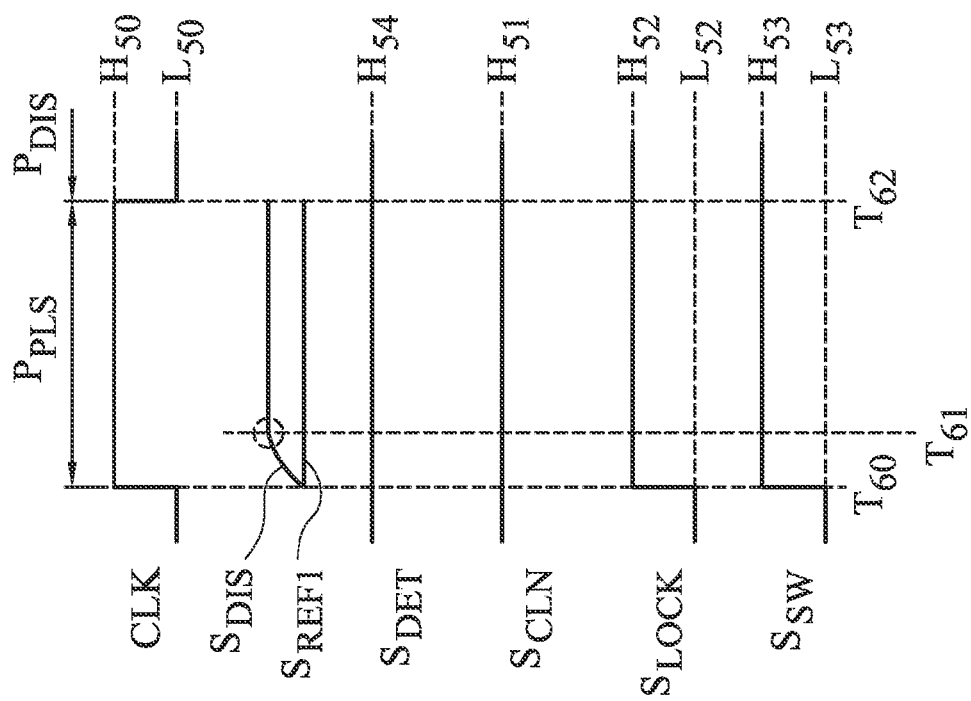
FIG. 6 shows an exemplary embodiment of waveforms of key signals in the case where a discharge path is provided in a predetermined period and after the predetermined period has elapsed.

In FIG. 3, a dotted-line block 31 is taken an example for illustrating the case where the discharge path is provided in the predetermined period $P_{PLS}$ and after the predetermined period $P_{PLS}$ has elapsed. The detailed waveforms of the key signals in the case of dotted-line block 31 are shown in FIG. 6. Before the time point T60, the detection signal $S_{DET}$ is initially at the high level H54, the clean signal $S_{CLN}$ is initially at the high level H51, and the lock signal $S_{LOCK}$ is initially at the low level L52. At the time point T60 (the beginning of the predetermined period $P_{PLS}$), the clock signal CLK switches to the high level H50 from the low level L50. The switch signal $S_{SW}$ switches to the high level H53 from the low level L53 in response to the switching of the clock signal CLK through the OR gate 42. In the period from the time point T60 to a time point T61, the discharge voltage signal $S_{DIS}$ is larger than the reference voltage signal $S_{REF1}$, and the detection circuit 225 still generates the detection signal $S_{DET}$ with the high level H54. Since the D flop-flop 40 is not triggered, the clean signal $S_{CLN}$ remains at the high level H51. Moreover, at the time point T60, the lock signal $S_{LOCK}$ switches to the high level H52 from the low level L52 in response to the rising edge of the clock signal CLK. Thus, the switch signal $S_{SW}$ remains at the high level H53 according to the OR logic between the clock signal CLK with the high level H50 and the lock signal $S_{LOCK}$ with the high level H52 in the period from the time point T60 to the time point T61.

Then, at the time point T61, the power source $V_{AC}$ stops being provided, that is the plug of the power supply circuit 2 is out from the socket. At this time, the discharge signal $S_{DIS}$ remains at an approximate DC level which is higher than the level of the reference voltage signal $S_{REF1}$. Thus, the discharge voltage signal $S_{DIS}$ is larger than the reference voltage signal $S_{REF1}$, and the detection circuit 225 generates the detection signal $S_{DET}$ with the high level H54. The clean signal $S_{CLN}$ still remains at the high level H51, and lock signal $S_{LOCK}$ remains at the high level H52. Thus, the switch signal $S_{SW}$ remains at the high level H53 according to the OR logic between the clock signal CLK with the high level H50 and the lock signal $S_{LOCK}$ with the high level H52 in the period from the time point T61 to the time point T62.

At a time point T62, the clock signal CLK switches to the low level L50 from the high level H50. Since no cross point occurs between the discharge voltage signal $S_{DIS}$ and the reference voltage signal $S_{REF1}$ in the predetermined period $P_{PLS}$, the detection signal $S_{DET}$ does not have any rising edge. The D flip-flop 40 thus still generates the clean signal $S_{CLN}$ with the high level H51. The D flip-flop 41 does not reset by the clean signal $S_{CLN}$. Thus, the lock signal $S_{LOCK}$ still remains at the high level H52. The switch signal $S_{SW}$ still remains at the high level H53 according to the OR logic between the clock signal CLK with the high level H50 and the lock signal $S_{LOCK}$ with the high level H52 from the tome point T62.

According to the above operation timing, in the predetermined period $P_{PLS}$, the switch signal $S_{SW}$ with the high level H53 turns on the NMOS transistor $M_1$, and the discharge path is provided for the X-capacitor $C_1$. When the power source $V_{AC}$ stops being provided (that is the plug of the power supply circuit 2 is out from the socket), after the predetermined period $P_{PLS}$ (that is after the time point T53), the switch signal $S_{SW}$ still remains at the high level H53 to turn on the NMOS transistor $M_1$, and the discharge path is provided continuously.

Figure 7:
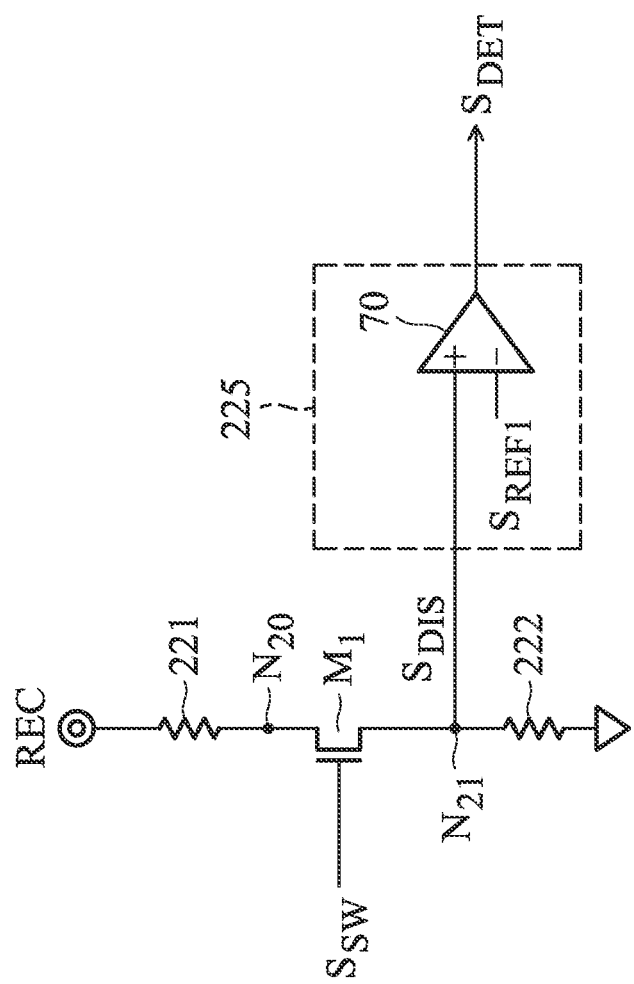
FIG. 7 shows an exemplary embodiment of a detection circuit of the power supply circuit in FIG. 2.

In the embodiment of FIGS. 5 and 6, the reference voltage signal $S_{REF1}$ is predetermined to be at an approximate DC level. FIG. 7 shows an exemplary embodiment of the detection circuit 225. In order to illustrate clearly, FIG. 7 also shows the resistors 221 and 222 and the NMOS transistor $M_1$. As shown in FIG. 7, the detection circuit 225 comprises a comparator 70. A positive input terminal of the comparator 70 is coupled to the node N21 to receive the discharge voltage signal $S_{DIS}$, and a negative input terminal thereof receives the reference voltage signal $S_{REF1}$ with the approximate DC level. By comparing the discharge voltage signal $S_{DIS}$ with the reference voltage signal $S_{REF1}$, the detection signal $S_{DET}$ is generated at an output terminal of the comparator 70. Through the comparison operation of the comparator 70, whether a cross point occurs between the discharge voltage signal $S_{DIS}$ with the reference voltage signal $S_{REF1}$ is detected.

Figure 8:
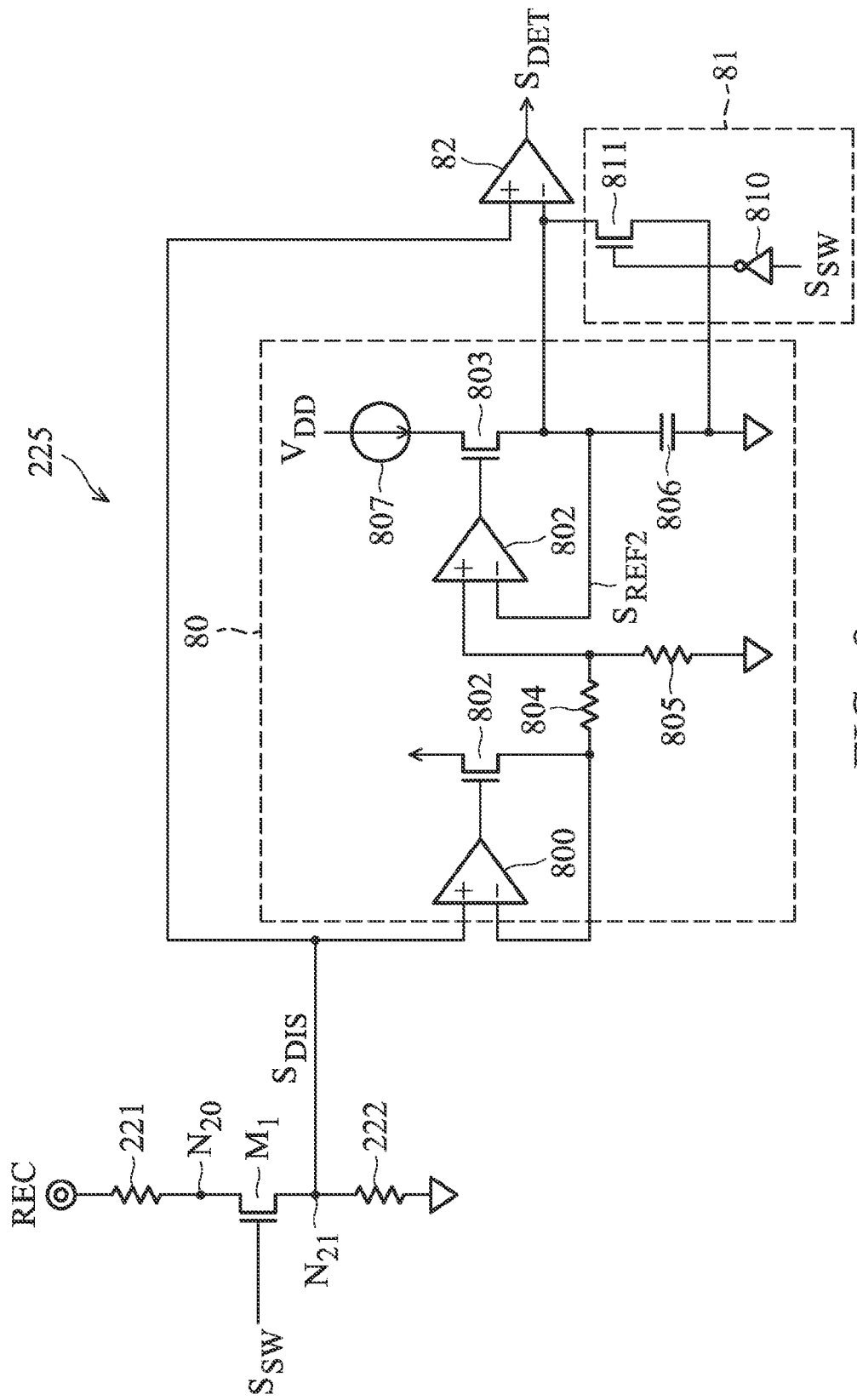
FIG. 8 shows another exemplary embodiment of a detection circuit of the power supply circuit in FIG. 2.
Figure 10:
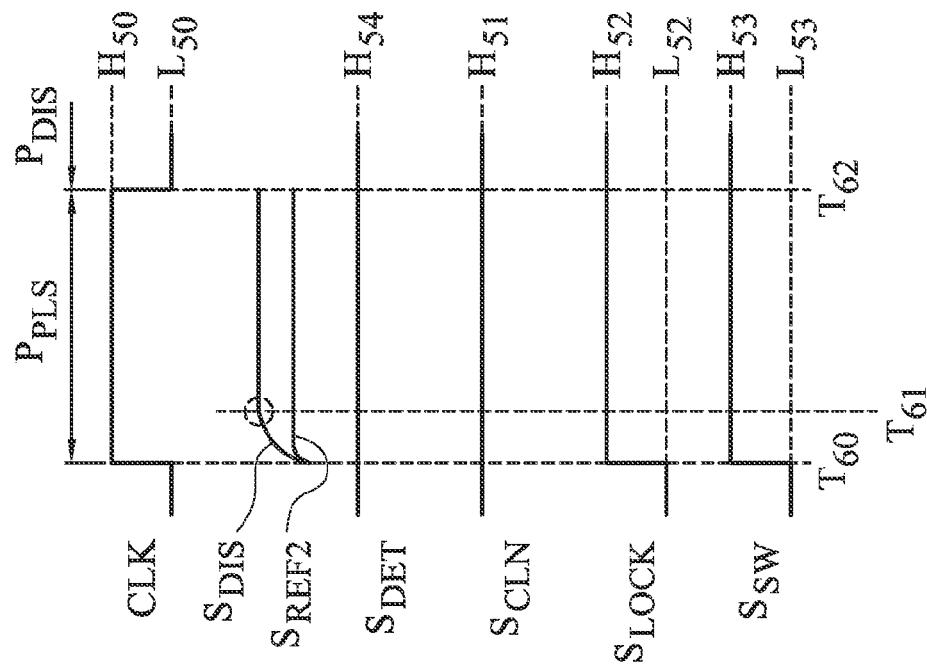
FIG. 10 shows another exemplary embodiment of waveforms of key signals in the case where a discharge path is provided in a predetermined period and after the predetermined period has elapsed.
Figure 9:
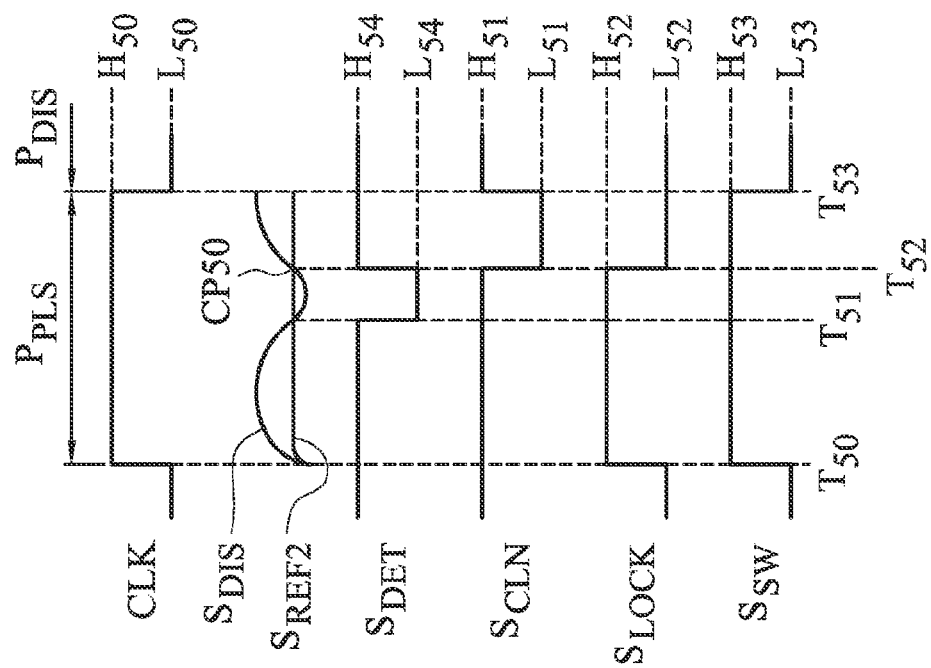
FIG. 9 shows another exemplary embodiment of waveforms of key signals in the case where a discharge path is provided in a predetermined period and then cut off after the predetermined period has elapsed.

In another embodiment, the reference voltage signal $S_{REF2}$ is determined by the magnitude of the discharge voltage signal $S_{DIS}$ occurring the before the predetermined period $P_{PLS}$, particularly, by the magnitude of the discharge voltage signal $S_{DIS}$ occurring the period $P_{DIS}$ (shown in FIG. 3) before the current predetermined period $P_{PLS}$. FIG. 8 shows another exemplary embodiment of the detection circuit 225. In order to illustrate clearly, FIG. 8 also shows the resistors 221 and 222 and the NMOS transistor $M_1$. As shown in FIG. 8, the detection circuit 225 comprises a buffer 80, a reset circuit 81, and a comparator 82. The buffer 80 comprises operational amplifiers 800 and 801, NMOS transistors 802 and 803, resistors 804 and 805, a capacitor 806, and a current source 807. Through the operation of the buffer 80, a voltage which is determined by the magnitude of the discharge voltage signal $S_{DIS}$ occurring the previous period $P_{DIS}$ is stored in the capacitor 806. The voltage stored in the capacitor 806 serves as the reference voltage signal $S_{REF2}$ in the current predetermined period $P_{PLS}$. Due to the capacitor 806 and the current source 807, the level of the reference voltage signal $S_{REF2}$ gradually rises and then remains at an approximate DC level. Thus, in the embodiment, the reference voltage signal $S_{REF2}$ varies with the magnitude of the discharge voltage signal $S_{DIS}$ occurring the previous the period $P_{DIS}$. The reset circuit 81 is coupled to the capacitor 806 and comprises an inverter 810 and an NMOS transistor 811. The inverter 810 receives the switch signal $S_{SW}$ and inverts the switch signal $S_{SW}$ to control the NMOS transistor 811. Through the operations of the inverter 810 and the NMOS transistor 811, after the predetermined period $P_{PLS}$ (that the current period $P_{DIS}$), the level of the reference voltage $S_{REF2}$ is reset to a level of the reference ground by discharging the capacitor 806. Then, the level of the reference voltage $S_{REF2}$ will be re-determined for the next predetermined period $P_{PLS}$. A positive input terminal of the comparator 82 is coupled to the node N21 to receive the discharge voltage signal $S_{DIS}$, and a negative input terminal thereof receives the reference voltage signal $S_{REF2}$ with the approximate DC level. By comparing the discharge voltage signal $S_{DIS}$ with the reference voltage signal $S_{REF2}$, the detection signal $S_{DET}$ is generated at an output terminal of the comparator 82. Through the comparison operation of the comparator 82, whether a cross point occurs between the discharge voltage signal $S_{DIS}$ and the reference voltage signal $S_{REF2}$ is detected. The reference voltage signal $S_{REF2}$ used by the detection circuit 225 of FIG. 8 is shown in FIGS. 9 and 10 which correspond the cases of the FIGS. 5 and 6.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A discharge circuit for an electromagnetic interference (EMI) filter, comprising:
   a switch circuit coupled to an X-capacitor of the EMI filter;
   a control circuit, coupled to the switch circuit, for turning on the switch circuit in a predetermined period to provide a discharge path; and
   a detection circuit, coupled to the discharge path, for, in the predetermined period, detecting whether a cross point occurs between a discharge voltage signal on the discharge path and a reference voltage signal to generate a detection signal which is provided to the control circuit,
   wherein when the detection circuit detects that the cross point does not occur between the discharge voltage signal and the reference voltage signal, the control circuit continuously turns on the switch circuit according to the detection signal after the predetermined period has elapsed.

2. The discharge circuit as claimed in claim 1 further comprising:
   a first resistor coupled between the X-capacitor and a first node of the switch circuit;
   a second resistor coupled between a second node of the switch circuit and a reference ground,
   wherein the discharge voltage signal is generated at the second node, and the detection circuit is coupled to the second node.

3. The discharge circuit as claimed in claim 1, wherein the control circuit comprises:
   a first D flip-flop having an input terminal receiving a supply voltage, a clock switch signal, an output terminal, and an inverted output terminal generates a clean signal;
   a second D flip-flop having an input terminal receiving the supply voltage, a clock terminal receiving a clock signal, a reset terminal receiving the clean signal, an output terminal generating a lock signal, and an inverted output terminal; and an OR gate receiving the clock signal and the lock signal and generating the switch signal according to the clock signal and the lock signal for turning on or off the switch circuit.

4. The discharge circuit as claimed in claim 1, wherein the detection circuit comprises:
a comparator for comparing the discharge voltage signal with the reference voltage signal to generate the detection signal.

5. The discharge circuit as claimed in claim 4, wherein the reference voltage signal varies with the discharge voltage signal before the predetermined period.

6. The discharge circuit as claimed in claim 1, wherein when the detection circuit detects that the cross point occurs between the discharge voltage signal and the reference voltage signal, the control circuit turns off the switch circuit after the predetermined period has elapsed.

7. A discharge circuit for an electromagnetic interference (EMI) filter, comprising:
a control circuit controlling a discharge path to be formed from an X-capacitor of the EMI filter to a reference ground in a predetermined period; and
a detection circuit for detecting whether a cross point occurs between a discharge voltage signal on the discharge path and a reference voltage signal to generate a detection signal which is provided to the control circuit,
wherein when the detection circuit detects that the cross point occurs between the discharge voltage signal and the reference voltage signal, the control circuit cuts off the discharge path according to the detection signal after the predetermined period has elapsed; and
wherein when the detection circuit detects that the cross point does not occur between the discharge voltage signal and the reference voltage signal, the control circuit conducts the discharge path according to the detection signal after the predetermined period has elapsed.

8. The discharge circuit as claimed in claim 7 further comprising:
a first resistor coupled between the X-capacitor and a first node;
a second resistor coupled between the first node and the reference ground,
wherein the discharge voltage signal is generated at the first node.

9. The discharge circuit as claimed in claim 7, wherein the control circuit comprises:
a first D flip-flop having an input terminal receiving a supply voltage, a clock terminal receiving the detection signal, a reset terminal receiving a switch signal, an output terminal, and an inverted output terminal generating a clean signal;
a second D flip-flop having an input terminal receiving the supply voltage, a clock terminal receiving a clock signal, a reset terminal receiving the clean signal, an output terminal generating a lock signal, and an inverted output terminal; and
an OR gate receiving the clock signal and the lock signal and generating the switch signal according to the clock signal and the lock signal for conducting or cutting off the discharge path.

10. The discharge circuit as claimed in claim 7, wherein the detection circuit comprises:
a comparator for comparing the discharge voltage signal with the reference voltage signal to generate the detection signal.

11. The discharge circuit as claimed in claim 10, wherein the reference voltage signal varies with the discharge voltage signal before the predetermined period.

* * * * *